(12) United States Patent
Wong et al.

(10) Patent No.: US 7,486,279 B2
(45) Date of Patent: Feb. 3, 2009

(54) INTEGRATED INPUT AND DISPLAY DEVICE FOR A MOBILE COMPUTER

(75) Inventors: Hong W. Wong, Portland, OR (US);
Wah Yiu Kwong, Beaverton, OR (US);
Hue V. Lam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 534 days.

(21) Appl. No.: 11/001,359

(22) Filed: Nov. 30, 2004

(65) Prior Publication Data

US 2006/0114238 A1   Jun. 1, 2006

(51) Int. Cl.
*G09G 5/00* (2006.01)

(52) U.S. Cl. .................... 345/173; 345/1.1; 345/1.3; 345/179; 463/36; 463/37; 463/38; 361/680; 361/786

(58) Field of Classification Search ......... 345/156–173, 345/179, 1.1–1.3; 463/36–38; 361/725–727, 361/741, 756, 786, 680–683
See application file for complete search history.

(56) References Cited

U.S. PATENT DOCUMENTS

| | | | | |
|---|---|---|---|---|
| 5,049,863 A * | 9/1991 | Oka | ............................ | 345/163 |
| 5,951,312 A | 9/1999 | Horng | | |
| 6,166,722 A * | 12/2000 | Kawabe et al. | ............... | 345/169 |
| 6,369,798 B1 * | 4/2002 | Yatsu et al. | .................. | 345/167 |
| 6,392,634 B1 * | 5/2002 | Bowers et al. | ............... | 345/163 |
| 6,392,871 B1 | 5/2002 | Yanase | | |
| 6,396,481 B1 * | 5/2002 | Challa et al. | ................. | 345/169 |
| 6,489,932 B1 * | 12/2002 | Chitturi et al. | ................. | 345/30 |
| 6,538,880 B1 * | 3/2003 | Kamijo et al. | ............... | 361/686 |
| 6,628,267 B2 * | 9/2003 | Karidis et al. | ............... | 345/168 |
| 6,670,950 B1 * | 12/2003 | Chin et al. | .................. | 345/173 |
| 6,894,894 B2 * | 5/2005 | Zarek et al. | ................. | 361/683 |
| 7,054,965 B2 * | 5/2006 | Bell et al. | ...................... | 710/72 |
| 7,266,774 B2 * | 9/2007 | Jones | .......................... | 715/733 |
| 2004/0160735 A1 | 8/2004 | Ghosh et al. | | |

FOREIGN PATENT DOCUMENTS

| | | |
|---|---|---|
| EP | 1361500 A1 | 11/2003 |
| EP | 1367477 A2 | 12/2003 |
| EP | 1427173 A1 | 6/2004 |
| JP | 06 035567 A | 2/1994 |

OTHER PUBLICATIONS

PCT Written Opinion for PCT/US2005/042278, mailed on Jun. 14, 2007 (17 pages).
PCT International Search Report for PCT Appln No. US2005/042278, mailed Sep. 10, 2006 (6 pages).
PCT Written Opinion for PCT Appln No. US2005/042278, mailed Sep. 10, 2006 (15 pages).

* cited by examiner

*Primary Examiner*—Henry N Tran
(74) *Attorney, Agent, or Firm*—Kacvinsky LLC

(57) ABSTRACT

A device and system are disclosed. In one embodiment the device comprises a primary display unit, a base unit coupled to the primary display unit, and a touch-sensitive secondary display unit, coupled to the base unit, operable to receive input from a user and display information for the user.

10 Claims, 11 Drawing Sheets

INTEGRATED INPUT AND DISPLAY DEVICE FOR A MOBILE COMPUTER

FIELD OF THE INVENTION

The invention relates to input and display devices in computers. More specifically, the invention relates to integrating an input device with a display device in a mobile computer.

BACKGROUND OF THE INVENTION

Chinese, Japanese, and Korean languages have thousands of characters. A standard keyboard input is impractical to use with these languages. There are many input devices on the market for these character sets. Many of the devices are external peripherals that combine a digitizer with a USB connection to allow for handwriting input into a computer. These devices have certain inherent disadvantages. One disadvantage is their extra cost, partially due to the additional materials involved in building an external device (i.e. the hard-shell exterior for the digitizer, the USB cabling, etc). The bulkiness of a separate device is another disadvantage. For example, if a user has a mobile computer, she would have to not only carry around the computer wherever she went, but she would also need to carry the USB digitizer input device if she wanted to have handwriting input capability.

Some mobile computer systems have recently been integrating a second display for additional visual output. These displays have commonly been used to obtain information when the computer system otherwise would be powered down. For example, a laptop computer that has wireless connectivity to a network could notify the user of a new email even with the laptop's shell closed. The secondary display may be placed on the outer shell and may notify the user of such things as wireless network signal strength, incoming emails, battery life, etc. This benefit would allow a user to always be connected and aware of information relating to the computer that she would otherwise not be aware of until she opened up the laptop shell and viewed the information on the primary display screen.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of an integrated input and display device for a mobile computer are disclosed. In the following description, numerous specific details are set forth. However, it is understood that embodiments may be practiced without these specific details. In other instances, well-known elements, specifications, and protocols have not been discussed in detail in order to avoid obscuring the present invention.

Figure 1A:
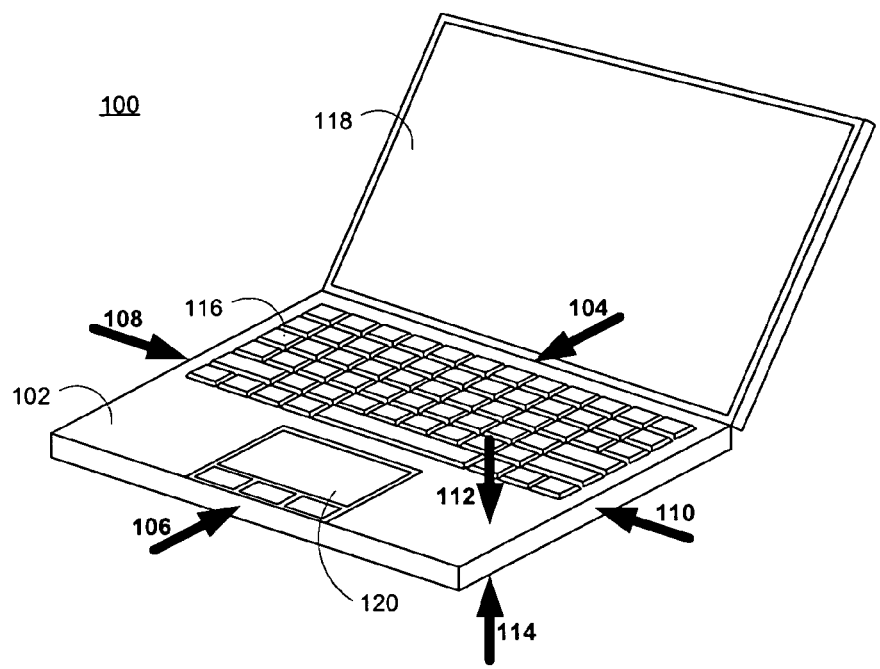
FIG. 1A is one embodiment of a mobile computer system with an integrated input and display device.

FIG. 1A is one embodiment of a mobile computer system with an integrated input and display device. The mobile computer system 100 includes a base unit 102. Future references in the specification to base unit locations can be referred to in Table 1.

TABLE 1

| Base Unit Locations | |
| --- | --- |
| Base Unit Location | FIG. 1A Element Number |
| Top | 104 |
| Bottom | 106 |
| Left | 108 |
| Right | 110 |
| Front | 112 |
| Back | 114 |

The surfaces of the left, top, and back sides are not visible in FIG. 1A, although the element number arrows referring to those sides in the Figure do point to an edge of each of their respective surfaces. For further clarification, the left side of the base unit is the side that faces the opposite direction as the right side, the top side of the base unit is the side that faces the opposite direction as the bottom side, and the back side of the base unit is the side that faces the opposite direction as the front side. In one embodiment, a keyboard 116 is coupled to the front side of the base unit 102. In one embodiment, the base unit 102 also contains a central processing unit, a motherboard, system memory, a graphics controller, among other components. In one embodiment, a primary display 118 is coupled to the base unit 102. Additionally, in one embodiment, an integrated input and display device 120 is coupled to the base unit 102.

Figure 1B:
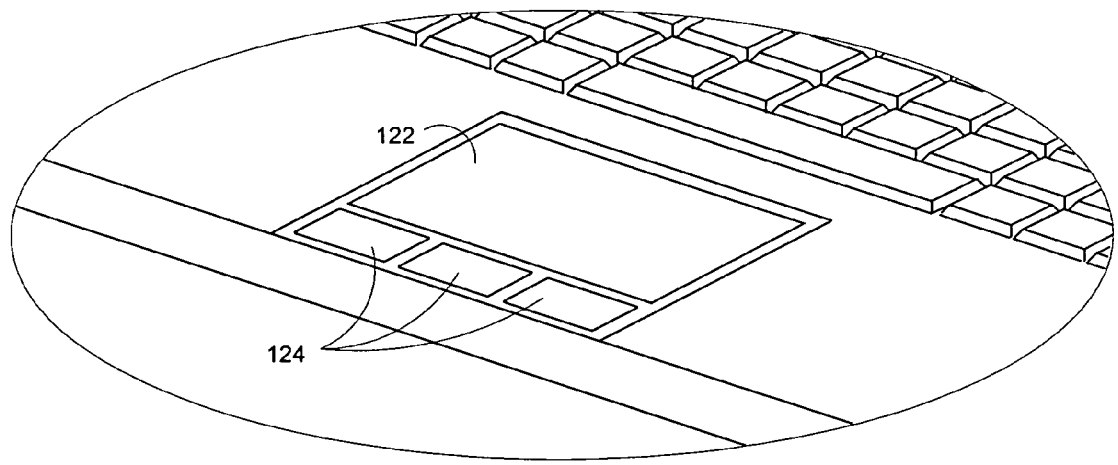
FIG. 1B is a close-up view of one embodiment of the integrated input and display device in FIG. 1A.

FIG. 1B is a close-up view of one embodiment of the integrated input and display device in FIG. 1A. In one embodiment, the integrated input and display device (120 in FIG. 1A) has a touch-sensitive display screen 122 and buttons 124 to function similarly to computer mouse buttons. In different embodiments, there may be one, two, three, or any other number of buttons 124. In another embodiment, there may be no buttons 124 and entering input can be accomplished by certain finger or pen-based tapping strokes applied directly to the touch-sensitive display screen 122.

Figure 2A:
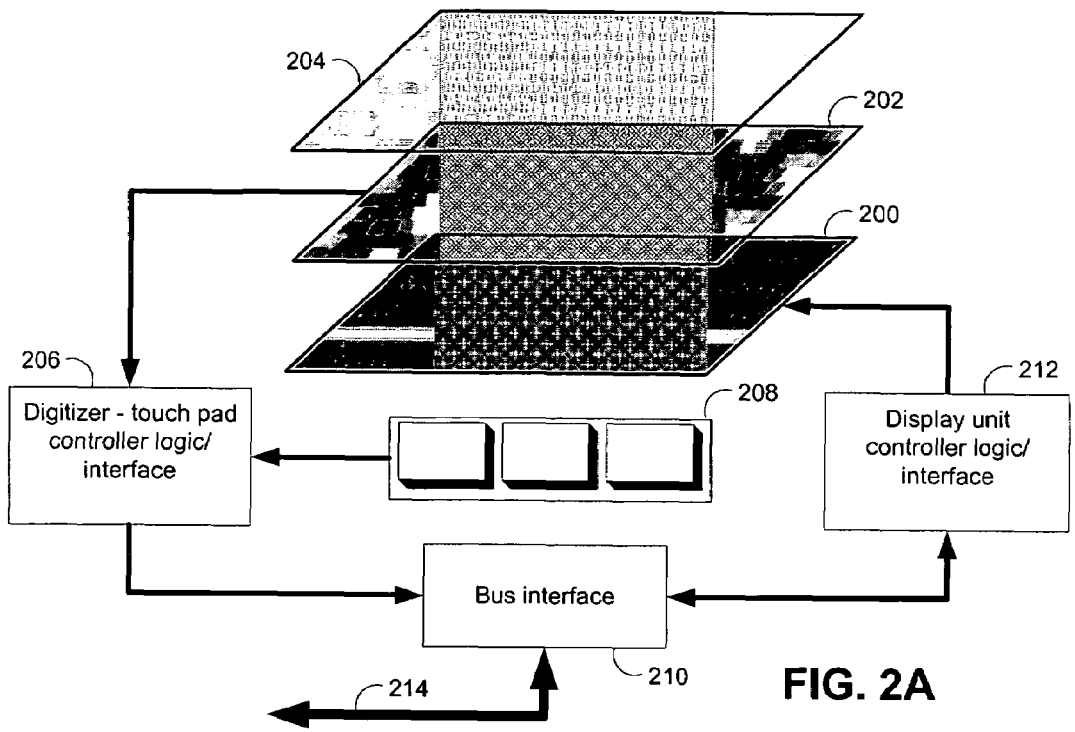
FIG. 2A describes one embodiment of the components of an integrated input and display device.

FIG. 2A describes one embodiment of the components of an integrated input and display device. In this embodiment, the exterior surface of the touch-sensitive display screen, the surface that the user actually comes in contact with, is a transparent protective layer 204. Immediately below the transparent protective layer 204 is a digitizer grid layer 202. Then immediately below the digitizer grid layer 202 is the display screen 200. In this embodiment, the digitizer grid layer 202 must be transparent to allow visual data from the display screen to be seen by a user through both the digitizer grid layer 202 and the transparent protective layer 204. In different embodiments, the display screen 200 may be an active thin-film transistor (TFT) screen, another form of liquid crystal display (LCD) screen, an organic light emitting diode (LED) screen, or one of any number of types of display screens.

In one embodiment, the digitizer grid layer 202 is pressure sensitive. Thus, it senses objects, such as a pen or a finger, that make contact with the transparent protective layer 204. The digitizer grid layer 202 converts the point touched on the grid to digital coordinates. The coordinates are then used in one or more functions associated with the integrated input and display device. In one embodiment, the transparent protective layer 204 is flexible to allow contact pressure to permeate through to the pressure-sensitive grid layer 202. The buttons 208 associated with the integrated input and display device provide additional user input. These buttons 208 function similarly to computer mouse buttons. In different embodiments, there may be any number of buttons associated with the integrated input and display device (including zero).

Once the digitizer grid layer 202 senses an object applying pressure at a point on the grid, it sends the digital coordinates of that point (or points) to the digitizer-touch pad controller logic and interface (hereafter referred to as the "digitizer controller") 206. In one embodiment, the digitizer grid layer 202 samples all of its X-Y grid positions at a predetermined time interval (e.g. 30 times per second) to send any external pressure input to the digitizer controller 206. In another embodiment, the digitizer grid layer 202 operates on an interrupt routine and sends pressure input to the digitizer controller as soon as the input is available. In one embodiment, input from the buttons 208 is also sent to the digitizer controller 206 in the same fashion. In one embodiment, the digitizer controller 206 first converts the pressure input digital coordinates and the button input into data that can be sent to bus interface 210. In another embodiment, data received from the digitizer grid layer 202 and the buttons 208 is already in a format compatible with the bus interface. Thus, in this embodiment, the digitizer controller 206 sends the data to the bus interface 210 when it receives the data.

The bus interface 210 routes data sent from the digitizer controller 206 to one or more appropriate destination. The destination (or destinations) of the data may depend on what is creating the pressure input. In one embodiment, if the pressure input is from a finger, the display screen 200 is not used because the integrated input and display device is being utilized in a touchpad function mode. In this mode, the integrated input and display device is substituting for an external mouse peripheral device and no special display functionality is needed on the display screen 200. Thus, in this embodiment, the bus interface 210 routes data to the rest of the computer system connected to the integrated input and display device via bus 214. In different embodiments, bus 214 may be a Universal Serial Bus (USB), a Peripheral Component Interconnect (PCI) bus, a 1394 bus, or any other bus capable of transmitting data from the integrated input and display device to the connected computer system.

In another embodiment, if the pressure input is from a digitizer pen, the display screen 200 is used because the user is writing on the integrated input and display device and the display screen 200 will then display the recorded pen strokes (this function will attempt to closely mimic a person writing with a normal pen on a piece of paper). In this embodiment, the bus interface 210 routes data both to the rest of the computer system connected to the integrated input and display device via bus 214 as well as to display unit controller logic and interface (hereafter referred to as the "display controller") 212. The display controller 212 then interprets the coordinate data sent from digitizer controller 206 and sends display data to the display screen 200 to activate the pixels on the display screen 200 that correspond with the coordinate data.

In order to function properly, the integrated input and display device needs to be aware of the instrument being used for pressure input. In one embodiment, one of the buttons 208 is used to switch between the touch pad input function and the pen stroke digitizer input function. In this embodiment, the user can notify the digitizer controller which type of input (i.e. finger or pen) is being currently used by pressing the button. In another embodiment, the digitizer controller 206 dynamically determines whether a finger or a pen is creating the pressure on the digitizer grid layer 202. In this embodiment, the digitizer controller discerns the number of adjacent X-Y grid locations where pressure is simultaneously applied. If a low number of adjacent grid locations have simultaneous pressure applied, then the determination is made that a pen is contacting the grid. Otherwise, if a high number of adjacent grid locations have simultaneous pressure applied, then the determination is made that a fingertip is contacting the grid.

Figure 2B:
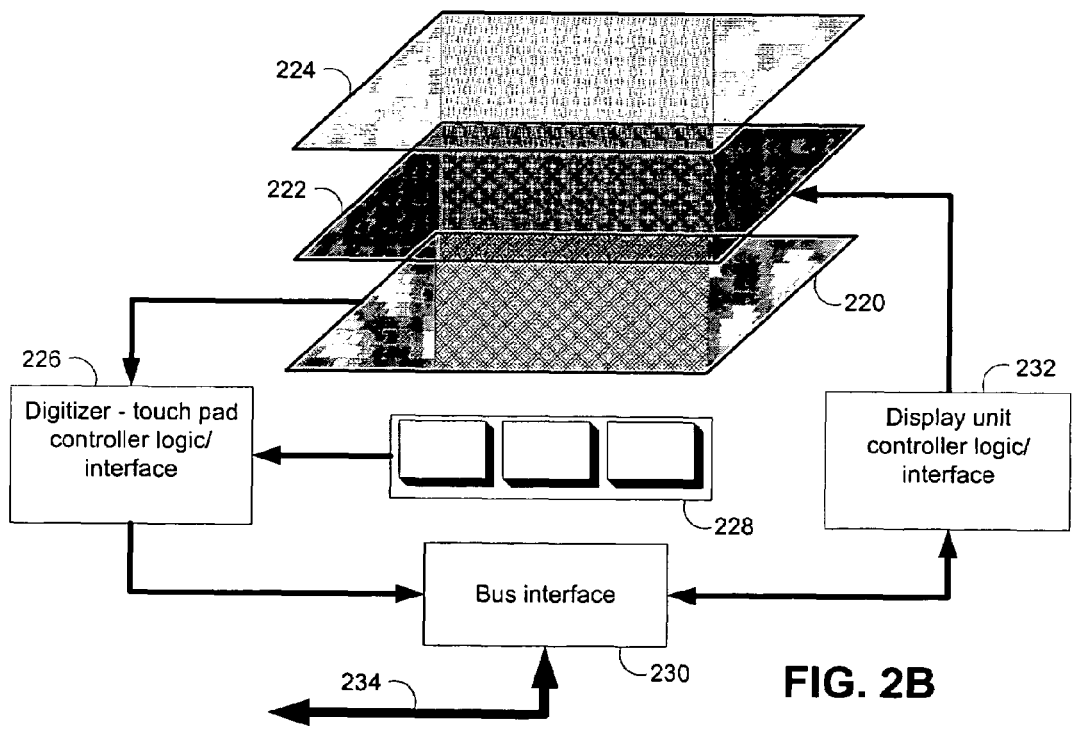
FIG. 2B describes another embodiment of the components of an integrated input and display device.

FIG. 2B describes another embodiment of the components of an integrated input and display device. Unless specified, each particular component described in FIG. 2A has the same functionality as the corresponding component in FIG. 2B. Thus for a detailed description of the functionality of a component in FIG. 2B please refer to the respective component discussed in the specification above referring to FIG. 2A. In this embodiment, the exterior surface of the touch-sensitive display screen, the surface that the user actually comes in contact with, is a transparent protective layer 224. Immediately below the transparent protective layer 224 is the display screen 222. Then immediately below the display screen 222 is a digitizer grid layer 220. In this embodiment, the transparent protective layer 224 and the display screen 222 allows capacitive or electromagnetic signals be permeated through to the digitizer grid layer 220. The buttons 228 associated with the integrated input and display device send additional user input.

Once the digitizer grid layer 220 senses an object applying capacitance or electromagnetic signal at a point on the grid, it sends the digital coordinates of that point (or points) to the digitizer controller 226. Additionally, the digitizer controller 226 also receives button input data from the user's interaction with the buttons 228. The digitizer controller 226 sends the digital coordinates and the button input data to the bus interface 230. In different embodiments, the digitizer controller 226 may or may not convert the data received to a certain bus format.

The bus interface 230 routes data sent from the digitizer controller 226 to one or more appropriate destinations. In one embodiment, the data is sent solely to the rest of the computer system connected to the integrated input and display device via bus 234. In another embodiment, the bus interface 230 routes data both to the rest of the computer system connected to the integrated input and display device via bus 234 as well as to the display controller 232. The display controller 232 then interprets the coordinate data sent from digitizer controller 226 and sends display data to the display screen 222 to activate the pixels on the display screen 222 that correspond with the coordinate data.

Figure 3A:
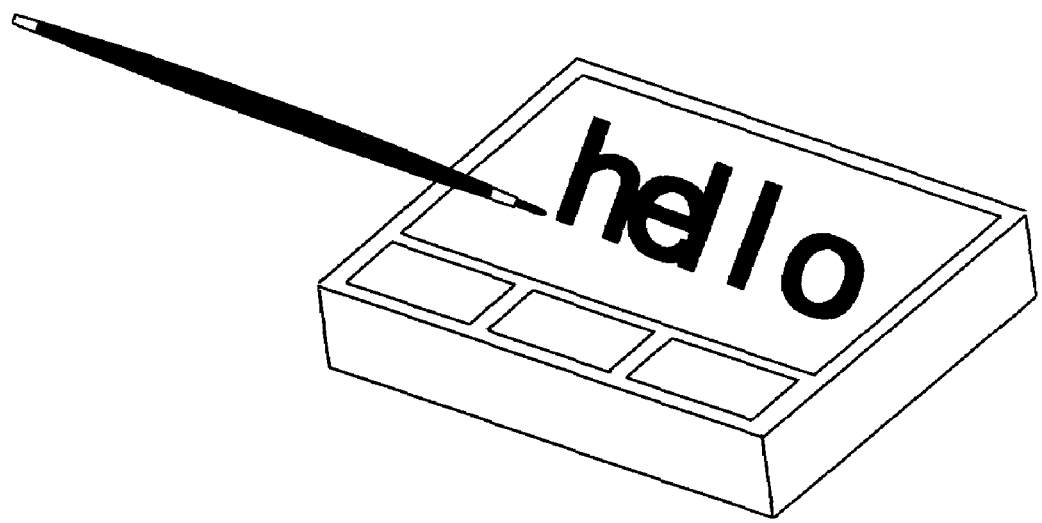
FIG. 3A describes one embodiment of a digitizer pen used in combination with the integrated input and display device to write in script format.

FIG. 3A-3D display four separate functions of one embodiment of the integrated input and display device. These functions are illustrative of some of the capabilities of the integrated input and display device but they are not an exhaustive list of possible functions. In FIG. 3A a digitizer pen is used in combination with the integrated input and display device in one embodiment to write in script format. In one embodiment, a computer system coupled to the integrated input and display device is capable of handwriting recognition. Thus, the user would be able to input words and sentences in a standard pen-based writing style instead of typing them in using a keyboard. In one embodiment, the integrated input and display device inputs the writing into the computer system and displays the writing in real time on the device's display screen.

Figure 3B:
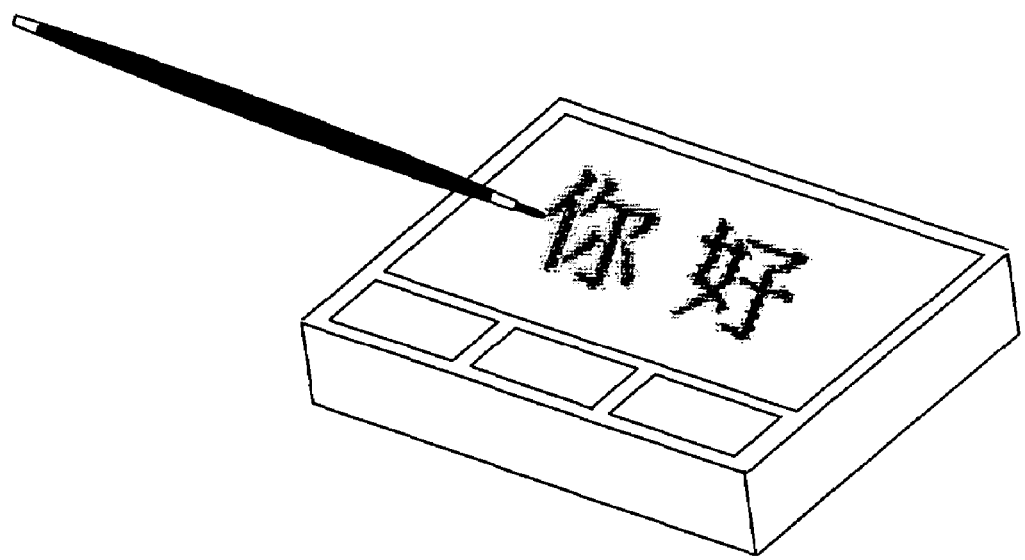
FIG. 3B describes one embodiment of a digitizer pen used in combination with the integrated input and display device to write characters in Chinese, Japanese, Korean, or another complex character-based language.

In FIG. 3B a digitizer pen is used in combination with the integrated input and display device in one embodiment to write characters in Chinese, Japanese, Korean, or another complex character-based language. In one embodiment, a computer system coupled to the integrated input and display device is capable of complex character language recognition (such as Chinese). Thus, the user would be able to use a standard pen-based writing style to input words and sentences of Chinese, Japanese, Korean or another complex character-based language into the computer system. In one embodiment, the integrated input and display device inputs the writing into the computer system and displays the writing in real time on the device's display screen.

Figure 3C:
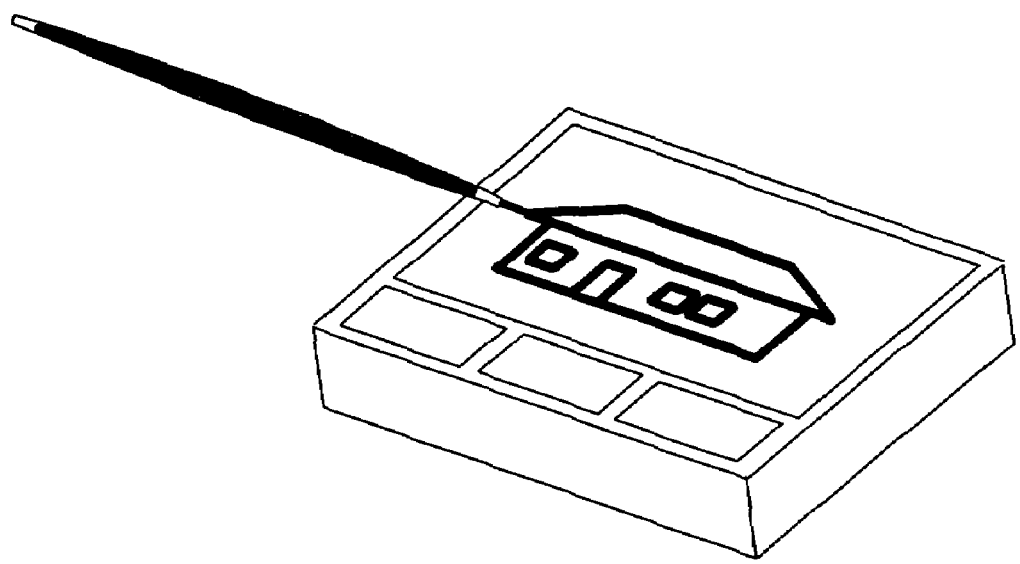
FIG. 3C describes one embodiment of a digitizer pen used in combination with the integrated input and display device to create drawings.

In FIG. 3C a digitizer pen is used in combination with the integrated input and display device in one embodiment to create drawings. In one embodiment, the integrated input and display device inputs the drawing strokes into the computer system and displays the drawing strokes in real time on the device's display screen.

Figure 3D:
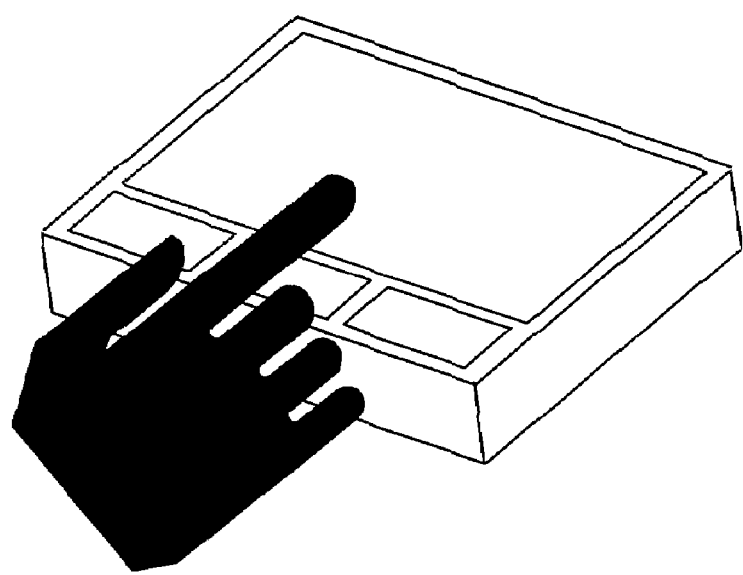
FIG. 3D describes one embodiment of a user interacting with the integrated input and display device with one or more fingers.

In FIG. 3D a user interacts with the integrated input and display device in one embodiment with one or more fingers. In one embodiment, the integrated input and display device functions the same as a standard touchpad input device to move a cursor and interact with the computer system's primary display screen.

Figure 4A:
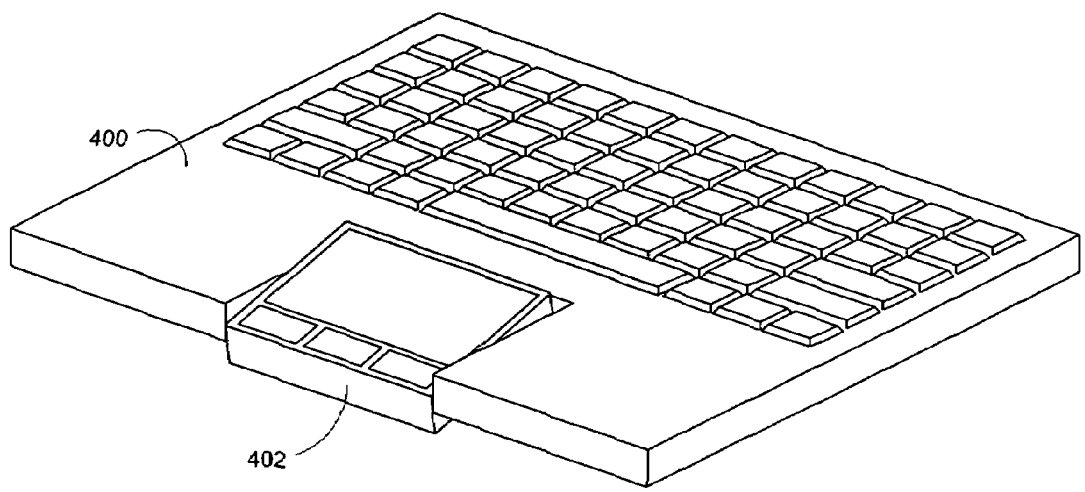
FIG. 4A displays one embodiment of a rotatable integrated input and display device coupled to the base unit of a mobile computing device.

FIG. 4A displays one embodiment of a rotatable integrated input and display device coupled to the base unit of a mobile computing device. In one embodiment, the base unit 400 is coupled to an integrated input and display device 402. In one embodiment, the integrated input and display device 402 is rotatable in relationship to the base unit 400.

Figure 4B:
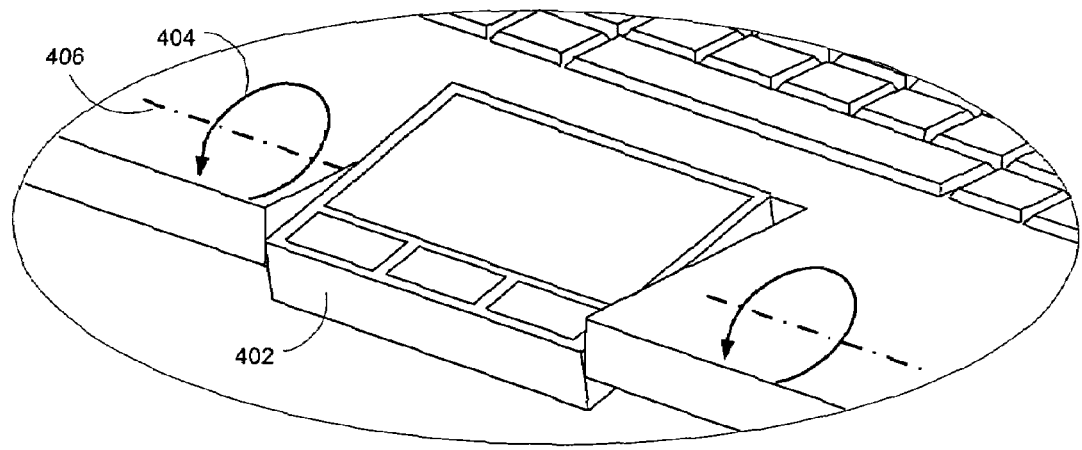
FIG. 4B is a close-up view of one embodiment of the rotatable integrated input and display device coupled to the base unit.

FIG. 4B is a close-up view of one embodiment of the rotatable integrated input and display device coupled to the base unit. In one embodiment, the integrated input and display device 402 can rotate 404 around an axis 406 in an opening in the base unit. The axis 406 runs parallel to the bottom side of the base unit (refer to Table 1 and FIG. 1A for reference to the bottom side of the base unit).

Figure 4C:
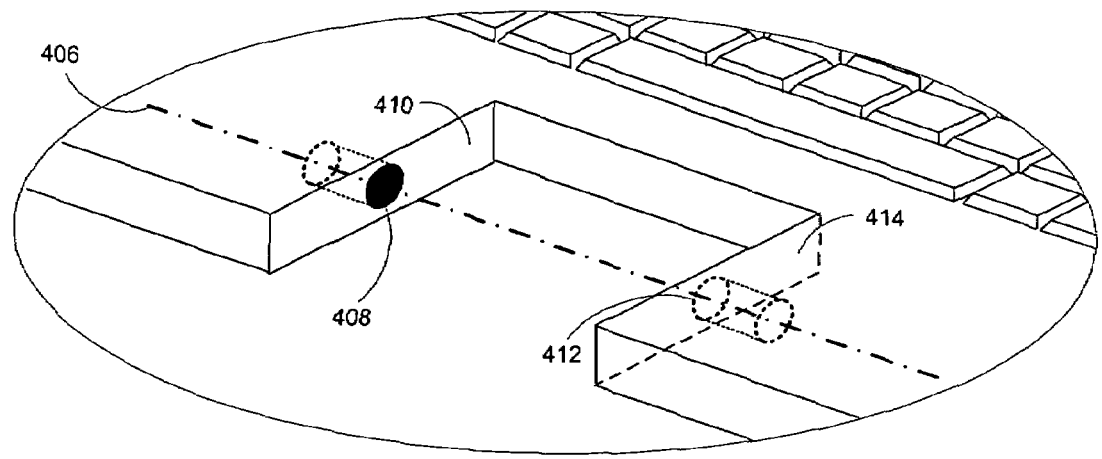
FIG. 4C is a detailed view of the opening in the base unit without the integrated input and display device in one embodiment.

FIG. 4C is a detailed view of the opening in the base unit without the integrated input and display device in one embodiment. In one embodiment, a left shaft 408 is located in the left side wall 410 of the opening and a right shaft 412 is located in the right side wall 414 of the opening. The two shafts are in line with axis 406.

Figure 4D:
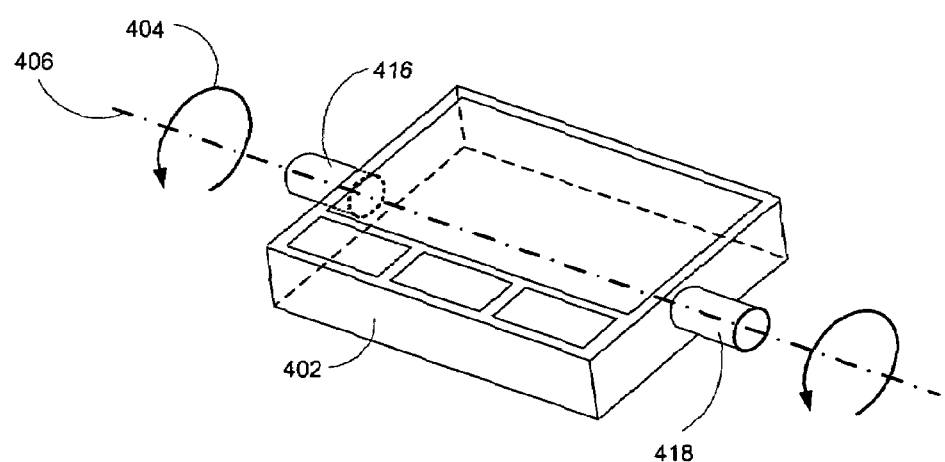
FIG. 4D is a view of one embodiment of the rotatable integrated input and display device without the accompanying base unit.

FIG. 4D is a view of one embodiment of the rotatable integrated input and display device without the accompanying base unit. In one embodiment, a left pin 416 is protruding out of the left side of the rotatable integrated input and display device 402 and a right pin 418 is protruding out of the right side of the rotatable integrated input and display device 402. The two pins are in line with the axis 406 and allow the rotatable integrated input and display device 402 to rotate 404 around the axis 406.

In one embodiment, the left and right pins (416 and 418 in FIG. 4D) are placed into the left and right shafts (408 and 412 in FIG. 4C) to couple the rotatable integrated input and display device to the base unit in the opening. The result of this coupling is shown in FIGS. 4A and 4B. In one embodiment, the diameter of each pin is slightly less than the diameter of each respective shaft. In this embodiment, the pins fit securely in the shafts but also are loose enough to allow for their rotation (404 in FIG. 4B) around the axis (406 in FIG. 4B). The rotatable integrated input and display device (402 in FIG. 4A) is additionally coupled to the base unit (400 in FIG. 4A) with one or more electrical and bus communication lines. The lines allow the rotatable integrated input and display device to receive power and communicate with the base unit. In one embodiment, these one or more lines run from an internal location within the rotatable integrated input and display device through one pin and into the base unit through an opening in the base of the respective shaft (i.e. the deep end of the shaft away from the opening). In another embodiment, the lines run through both pins and through openings in the base of both shafts.

Figure 5A:
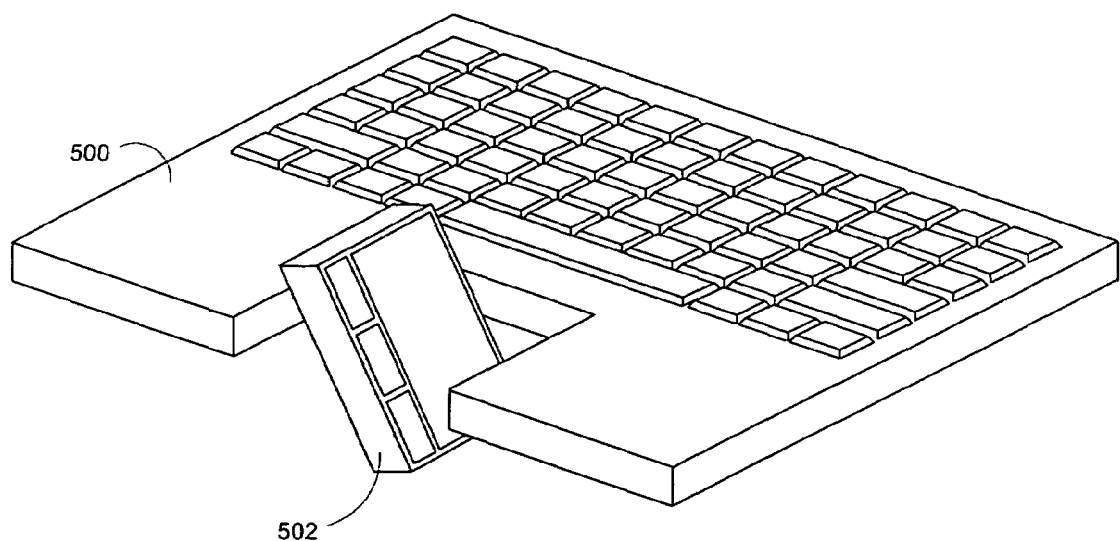
FIG. 5A displays one embodiment of a rotatable integrated input and display device coupled to the base unit of a mobile computing device.

FIG. 5A displays one embodiment of a rotatable integrated input and display device coupled to the base unit of a mobile computing device. In one embodiment, the base unit 500 is coupled to an integrated input and display device 502. In one embodiment, the integrated input and display device 502 is rotatable in relationship to the base unit 500.

Figure 5B:
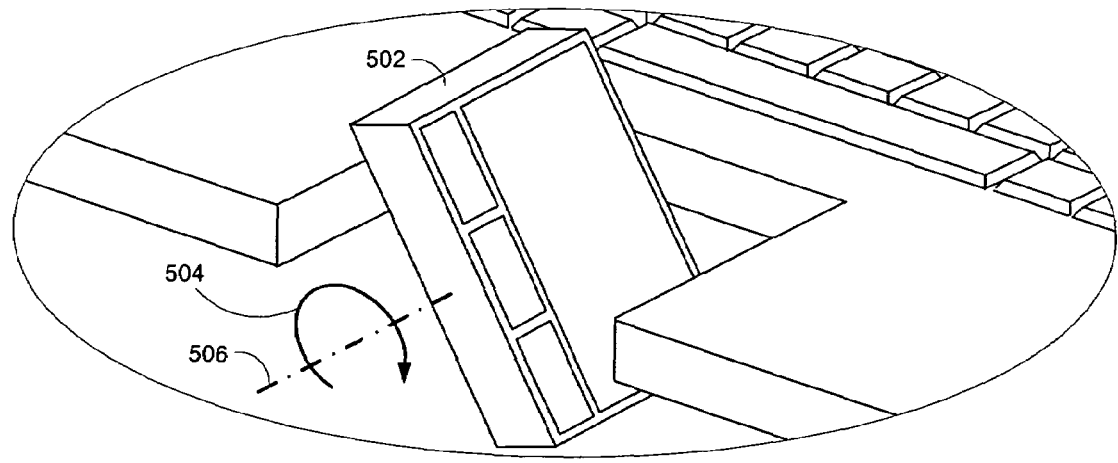
FIG. 5B is a close-up view of another embodiment of the rotatable integrated input and display device coupled to the base unit.

FIG. 5B is a close-up view of another embodiment of the rotatable integrated input and display device coupled to the base unit. In one embodiment, the integrated input and display device 502 can rotate 504 around an axis 506 in an opening in the base unit. The axis 506 runs parallel to the left and right sides of the base unit (refer to Table 1 and FIG. 1A for reference to the left and right sides of the base unit).

Figure 5C:
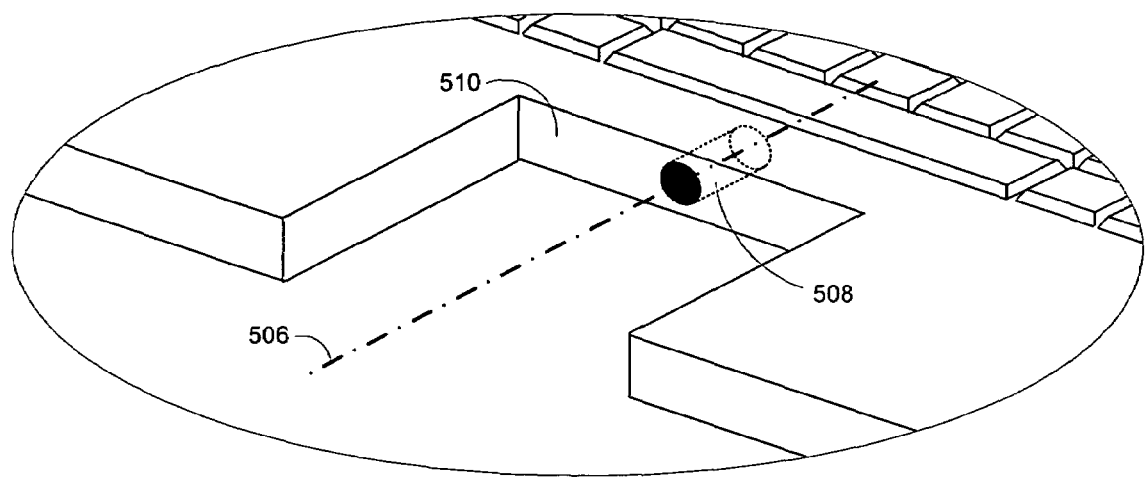
FIG. 5C is a detailed view of the opening in the base unit without the integrated input and display device in another embodiment.

FIG. 5C is a detailed view of the opening in the base unit without the integrated input and display device in another embodiment. In one embodiment, a top shaft 508 is located in the top wall 510 of the opening. The shaft is in line with axis 506.

Figure 5D:
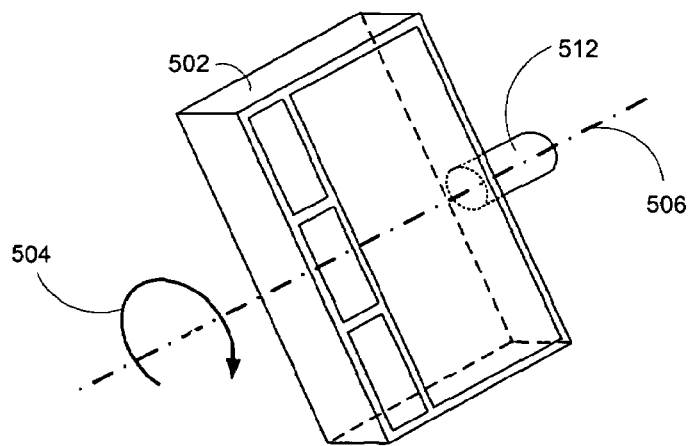
FIG. 5D is a view of another embodiment of the rotatable integrated input and display device without the accompanying base unit.

FIG. 5D is a view of another embodiment of the rotatable integrated input and display device without the accompanying base unit. In one embodiment, a top pin 512 is protruding out of the top side of the rotatable integrated input and display device 502. The pin is in line with the axis 506 and allows the rotatable integrated input and display device 502 to rotate 504 around the axis 506.

In one embodiment, the top pin (512 in FIG. 5D) is placed into the top shaft (508 in FIG. 4C) to couple the rotatable integrated input and display device to the base unit in the opening. The result of this coupling is shown in FIGS. 5A and 5B. In one embodiment, the diameter of the pin is slightly less than the diameter the shaft. In this embodiment, the pin fits securely in the shaft but is loose enough to allow for its rotation (504 in FIG. 5B) around the axis (506 in FIG. 5B). The rotatable integrated input and display device (502 in FIG. 5A) is additionally coupled to the base unit (500 in FIG. 5A) with one or more electrical and bus communication lines. The lines allow the rotatable integrated input and display device to receive power and communicate with the base unit. In one embodiment, these one or more lines run from an internal location within the rotatable integrated input and display device through the pin and into the base unit through an opening in the base of the shaft (i.e. the deep end of the shaft away from the opening).

In some embodiments, the integrated input and display device, that is coupled to a mobile computing device, may function when the mobile computing device is closed. FIGS. 6A-6D display one embodiment of a sequence allowing the integrated input and display device to be utilized when the mobile computing device is closed.

Figure 6A:
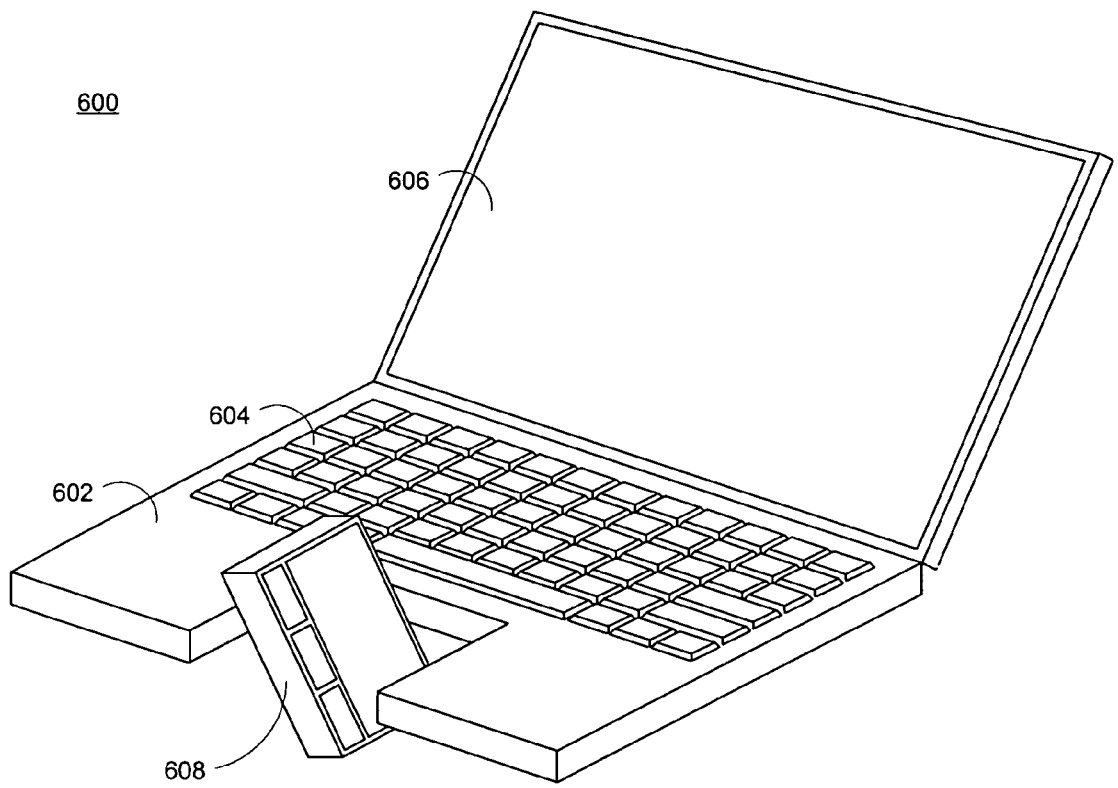
FIG. 6A is one embodiment of a mobile computer system with an integrated input and display device in an open position.

FIG. 6A is one embodiment of a mobile computer system with an integrated input and display device in an open position. The mobile computer system 600 includes a base unit 602. In one embodiment, a keyboard 604 is coupled to the front side of the base unit 602. In one embodiment, a primary display 606 is coupled to the top side of the base unit 602 with one or more hinges (refer to Table 1 and FIG. 1A for reference to the top side of the base unit). Additionally, in one embodiment, an integrated input and display device 608 is coupled to the base unit 602.

Figure 6B:
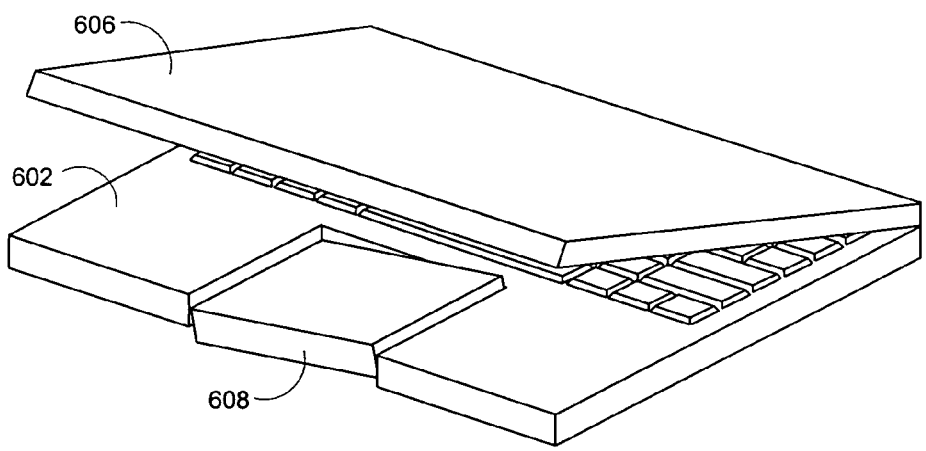
FIG. 6B is one embodiment of a mobile computer system with an integrated input and display device in a semi-closed position.

FIG. 6B is one embodiment of a mobile computer system with an integrated input and display device in a semi-closed position. The primary display 606 is in a partially closed position in relationship to the base unit 602. In FIG. 6B the side of the integrated input and display device (608) with the display screen and buttons (referred to in FIG. 1B) has been substantially rotated to a position facing the back side of the base unit (refer to Table 1 and FIG. 1A for reference to the back side of the base unit).

Figure 6C:
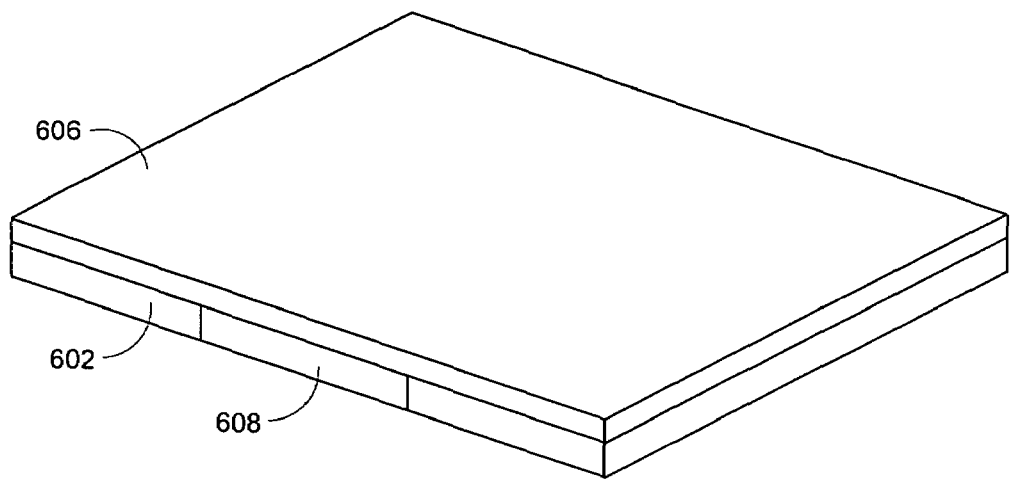
FIG. 6C is one embodiment of a mobile computer system with an integrated input and display device in a closed position.

FIG. 6C is one embodiment of a mobile computer system with an integrated input and display device in a closed position. The primary display 606 is in a completely closed position in relationship to the base unit 602. In FIG. 6C the side of the integrated input and display device (608) with the display screen and buttons (referred to in FIG. 1B) has been fully rotated to a position facing the back side of the base unit (refer to Table 1 and FIG. 1A for reference to the back side of the base unit).

Figure 6D:
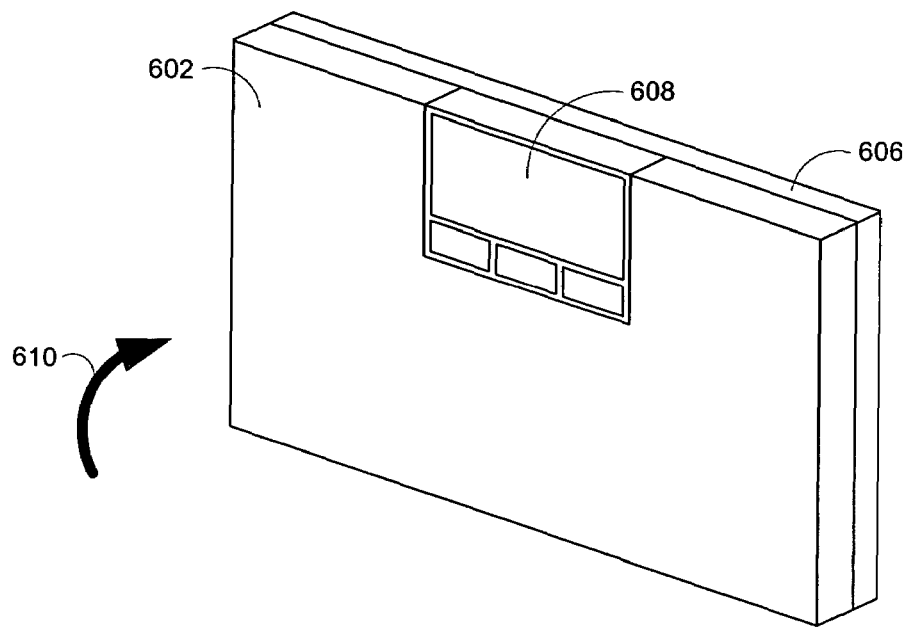
FIG. 6D is another embodiment of a mobile computer system with an integrated input and display device in a closed position.

FIG. 6D is another embodiment of a mobile computer system with an integrated input and display device in a closed position. As in FIG. 6C, the primary display 606 is in a completely closed position in relationship to the base unit 602. Though, in this embodiment, the entire mobile computing device has been rotated 610 so that the back side of the base unit 602 is visible (refer to Table 1 and FIG. 1A for reference to the back side of the base unit). Additionally, the side of the integrated input and display device (608) with the display screen and buttons (referred to in FIG. 1B) has been fully rotated to a position facing the back side of the base unit. Thus, the display screen and buttons of the integrated input and display device are also visible.

Figure 6E:
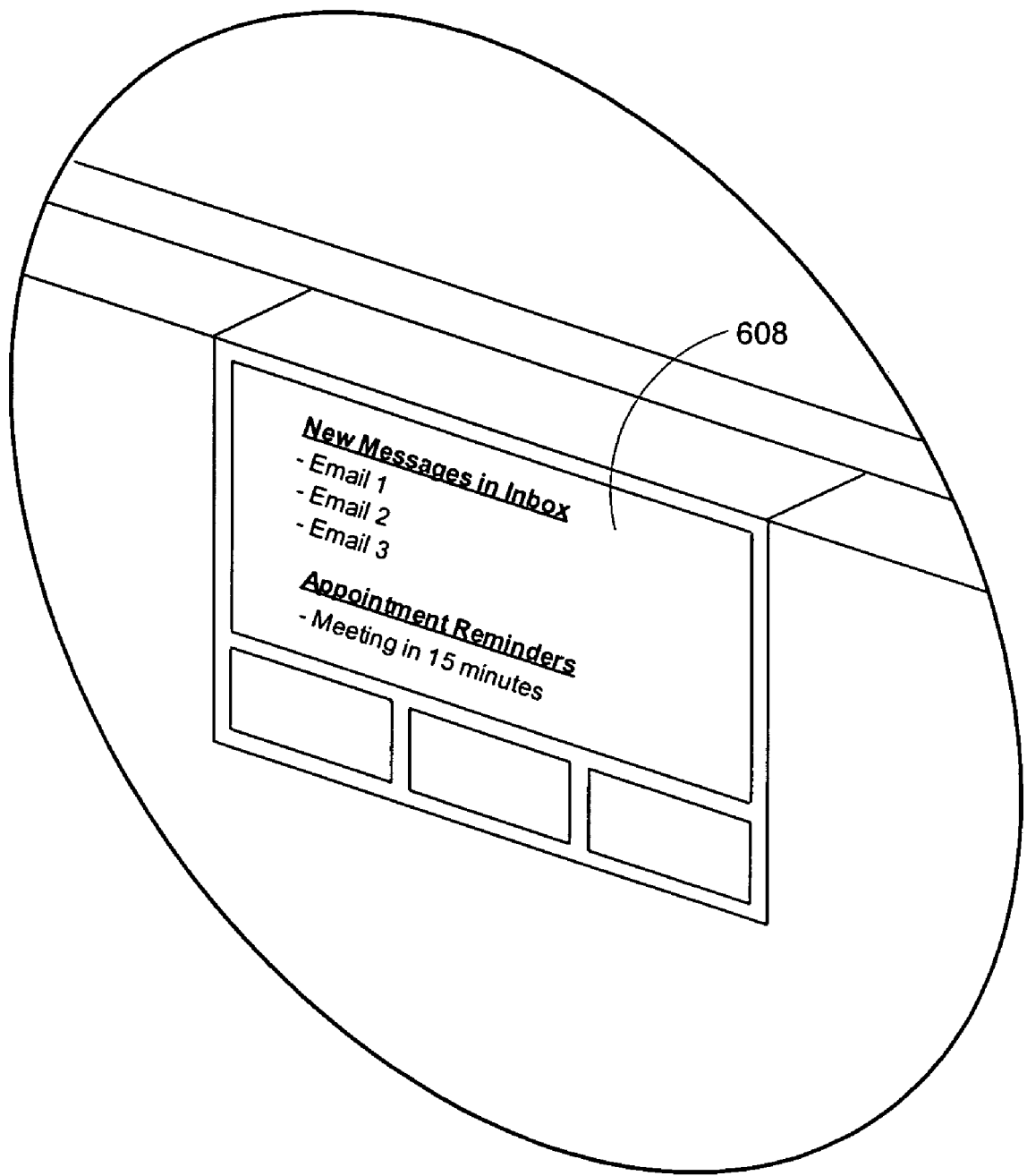
FIG. 6E is one embodiment of a close-up view of the integrated input and display device in FIG. 6D.

FIG. 6E is one embodiment of a close-up view of the integrated input and display device in FIG. 6D. Once the mobile computer system is closed the integrated input and display device 608 may have many different functionalities. In different embodiments, the integrated input and display device 608 may be operable to display information such as wireless network signal strength, incoming emails, reminders for meetings, and battery life among many other functions.

Thus, embodiments of an integrated input and display device for a mobile computer are disclosed. These embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A device, comprising:
    a primary display unit;
    a base unit coupled to the primary display unit, the base unit comprising a front side, a back side, and an opening, the front side including a keyboard;
    a touch-sensitive secondary display unit comprising a touch sensitive display screen located on a front side of the secondary display unit and a protective housing located on a back side of the secondary display unit, the secondary display unit coupled to the base unit, the touch sensitive display screen operative to receive a first input from a user comprising movement input and display a mouse cursor on the primary display unit, or a second input from a user comprising handwriting input and display a character on the primary display unit;
    one or more pivot shafts, the one or more pivot shafts operative to couple the secondary display unit to the base unit at one or more locations in the opening and to allow at least a portion of the secondary display unit to rotate in the opening;
    wherein the opening is operative to house at least a portion of the secondary display unit in a recessed location, the secondary display unit has at least a first orientation and a second orientation, the first orientation being when the display screen is facing the same direction as the front side of the base unit, the second orientation being when the display screen is facing the same direction as the back side of the base unit, and the secondary display unit to be operational in the first orientation and in the second orientation.

2. The device of claim 1, further comprising one pivot shaft, wherein the pivot shaft couples the center of the top of the secondary display unit to the top of the opening.

3. The device of claim 1, further comprising two pivot shafts, wherein a first pivot shaft couples the center of the left side of the secondary display unit to the left side of the opening and a second pivot shaft couples the center of the right side of the secondary display unit to the right side of the opening.

4. The device of claim 1, further comprising a hinge, the hinge coupling the bottom of the primary display unit to the top of the base unit, to allow the primary display unit to close and attach to the front side of the base unit.

5. The device of claim 4, further operable to allow the secondary display unit to be operational when the display screen is facing the same direction as the back side of the base unit only if the primary display unit is closed and attached to the front side of the base unit.

6. A device, comprising:

a keyboard;

a base unit comprising a front side, a back side, and an opening, the front side including a keyboard;

a touch-sensitive display screen located on a front side of a secondary display unit and a protective housing located on a back side of the secondary display unit, the touch-sensitive display screen operative to provide cursor movement input or handwriting input for transmission across a bus, the bus operable to transmit information keyed into the keyboard and information input on the touch-sensitive display to an I/O bus in a computer system;

one or more pivot shafts, the one or more pivot shafts operative to couple the secondary display unit to the base unit at one or more locations in the opening and to allow at least a portion of the secondary display unit to rotate in the opening; and wherein the opening is operative to house at least a portion of the secondary display unit in a recessed location, the touch-sensitive display screen has at least a first orientation and a second orientation, the first orientation being when the display screen is facing the same direction as the keyboard, the second orientation being when the display screen is facing the opposite direction as the keyboard, and the touch-sensitive display screen to be operational in the first orientation and in the second orientation.

7. The device of claim 6, wherein the touch-sensitive display screen is operable to display information input on the device.

8. A system, comprising:

a bus;

a primary display unit;

a computer base unit coupled to the primary display unit and to the bus, the computer base unit comprising a front side, a back side, and an opening, the front side including a keyboard;

a touch-sensitive secondary display unit comprising a touch sensitive display screen located on a front side of the secondary display unit and a protective housing located on a back side of the secondary display unit, the secondary display unit coupled to the bus, the touch sensitive display screen operative to receive a first input from a user comprising movement input and display a mouse cursor on the primary display unit, or a second input from a user comprising handwriting input and display a character on the primary display unit; and one or more pivot shafts, the one or more pivot shafts operative to couple the secondary display unit to the base unit at one or more locations in the opening, to house at least a portion of the bus, and to allow at least a portion of the secondary display unit to rotate in the opening;

wherein the opening is operative to house at least a portion of the secondary display unit in a recessed location, the secondary display unit has at least a first orientation and a second orientation, the first orientation being when the display screen is facing the same direction as the front side of the base unit, the second orientation being when the display screen is facing the same direction as the back side of the base unit, and the secondary display unit to be operational in the first orientation and in the second orientation.

9. The system of claim 8, further comprising one pivot shaft, wherein the pivot shaft couples the center of the top of the secondary display unit to the top of the opening.

10. The system of claim 8, further comprising two pivot shafts, wherein a first pivot shaft couples the center of the left side of the secondary display unit to the left side of the opening and a second pivot shaft couples the center of the right side of the secondary display unit to the right side of the opening.

* * * * *